Patented Sept. 11, 1945

2,384,545

UNITED STATES PATENT OFFICE 2,384,545

BUTADIENE COPOLYMERS

Charles F. Fryling, Akron, Ohio, assignor, by mesne assignments, to The B. F. Goodrich Company, Akron, Ohio, a corporation of New York No Drawing. Application September 13, 1941, Serial No. 410,762

14 Claims. (Cl. 260—84.5)

This invention relates tot he preparation of rubber-like butadiene copolymers and particularly to the preparation of synthetic rubber latices from which films of rubber-like butadiene copolymers having desirable properties may be deposited.

It has previously been known that butadiene-1,3 (hereinafter called butadiene) may be copolymerized in the form of an aqueous emulsion with about 15 to 50% by weight based on the polymerizable compounds present of a copolymerizable unsaturated organic compound or monomer, which enters into polymeric chains only by 1-2 addition and which contains a methylene ($CH_2=$) group attached to a single carbon atom which is also connected to an electron attracting group, that is, a group which substantially increases the electrical dissymmetry or polar character of the molecule. While massive butadiene copolymers of excellent properties have been obtained by coagulating the dispersions formed by such polymerizations, thin films deposited from the dispersions have not possessed the desirable properties exhibited by films deposited from natural latex. Specifically, films deposited from synthetic rubber latices of the type mentioned above have been weak and exhibited poor elongation and elasticity. The use of dispersions of butadiene copolymers to deposit films of synthetic rubber has accordingly been extremely limited.

I have now discovered that films exhibiting greatly improved properties may be deposited from a dispersion prepared by the polymerization in the form of an aqueous emulsion of a mixture of butadiene with about 15 to 50% by weight based on the polymerizable compound present of a copolymerizable compound, and piperylene. The piperylene may be present in any desired amount by weight less than the butadiene, although the use of not over one-half as much piperylene as butadiene is preferred. The use of amounts of piperylene as small as 0.5% or even less based on the butadiene produces an appreciable improvement in the properties of the products. The preferred latices are prepared by the copolymerization of from 40 to 55 parts by weight of butadiene, 5 to 20 parts of piperylene, and 20 to 45 parts of acrylonitrile. Other conjugated diene hydrocarbons such as isoprene and 2,3-dimethylbutadiene may be present during the polymerization if desired, and mixtures of copolymerizable compounds may be employed instead of single compounds.

Example I

A mixture of 40 parts by weight of butadiene, 15 parts of piperylene, and 45 parts of acrylonitrile was agitated at 30° C. in the presence of about 250 parts of a 2% aqueous solution of myristic acid which had been 85% neutralized with sodium hydroxide, 0.35 part of hydrogen peroxide as an initiator, 0.11 part of sodium ferripyrophosphate as a catalyst and 0.6 part of diisopropyl dixanthogen as a modifier. A synthetic rubber latex which could be deposited on a form as a thin film exhibiting excellent wet strength and elongation was obtained. It was exceedingly difficult, however, to manufacture articles by the deposition of thin films of synthetic rubber from dispersions prepared by the polymerization of butadiene and acrylonitrile in the absence of piperylene, due to the weakness of the films and the ease with which they could be torn and distorted. When the synthetic rubber latex prepared by the copolymerization of butadiene, acrylonitrile and piperylene was coagulated to form a massive product which was then tested in a tire tread recipe, the vulcanizate exhibited a higher elongation than those prepared from copolymers of butadiene and acrylonitrile in the absence of piperylene.

Example II

A mixture of 55 parts of butadiene, 15 parts of piperylene, and 30 parts of methyl methacrylate was agitated at 35° C. in the presence of about 250 parts of a 3% solution of sodium myristate, 0.14 part of hydrogen peroxide, 0.17 part of sodium ferripyrophosphate and 0.45 part of diisopropyl dixanthogen. The films deposited from the resulting dispersions exhibited excellent strength and the vulcanized synthetic rubbers exhibited a higher elongation than those prepared by the copolymerization of butadiene and methyl methacrylate in the absence of piperylene.

Example III

A mixture of 9 parts of butadiene, 2 parts of piperylene and 9 parts of acrylonitrile was agitated at 30° C. in the presence of about 18 parts of a 1% aqueous solution of sodium alkyl naphthalene sulfonate as an emulsifying agent, 0.052 part of hydrogen peroxide, 0.12 part of diisopropyl dixanthogen and a small amount of a catalyst of the type employed in the previous examples. When the rubber was deposited upon a form, a film exhibiting much greater strength, elongation and elasticity was obtained than when the dispersion obtained by copolymerizing 11 parts of butadiene and 9 parts of acrylonitrile in the above recipe was employed.

Piperylene may be employed to improve the properties of copolymers of butadiene with any copolymerizable monomer of the character described hereinabove such as styrene, isobutylene, acrylonitrile, methyl methacrylate, methyl acrylate, methyl vinyl ether, methyl vinyl ketone and other similar unsaturated hydrocarbons, ethers, esters, and ketones.

The polymerization may be effected in the presence of any desired emulsifying agents such as water-soluble soaps including sodium oleate, potassium palmitate and sodium myristate, or synthetic emulsifying agents such as hymolal sulfates and alkaryl sulfonates including sodium lauryl sulfate and sodium isopropyl naphthalene sulfonate. When the dispersion is to be employed to deposit thin films upon a form, it is desirable to include in the emulsion during or after the polymerization a non-electrolytic emulsifying agent such as a material containing either a long aliphatic chain or an aromatic group solubilized with a chain of $(O-CH_2-CH_2)_x$ groups preferably terminating with a hydroxyl group. These compounds are in general prepared by condensation reactions of higher alcohols or aromatic compounds with ethylene oxide. The preparation of one such class of non-electrolytic emulsifying agents is described in U. S. Patent 2,222,967.

The polymerization is preferably conducted in the presence of a small amount of a heavy metal catalyst. The heavy metal catalyst may be added to the emulsion in the form of less than .1% based on the weight of the monomers of a sample ionizable heavy metal salt such as cobalt chloride or nickel sulfate as disclosed in the copending application of William D. Stewart, Serial No. 379,712, filed February 14, 1941, or in the form of a complex of a heavy metal and a material such as sodium pyrophosphate, levulinic acid, glycine, cytine, beta-mercaptoethanol, quebrachitol, ox-bile or cholesterol, as disclosed in the copending applications of William D. Stewart, Serial Nos. 379,713 to 379,717, filed February 14, 1941.

The polymerization may be effected by various initiators of polymerization such per-compounds including hydrogen peroxide, ammonium persulfate, potassium persulfate and other peroxides and per-salts such as persulfates, perborates, percarbonates and the like as well as other types of initiators such as diazoaminobenzene, dipotassium diazomethane disulfonate and triphenyl-methylazobenzene.

Sulfur-containing organic compounds herein called modifiers which increase the plasticity and solubility of the polymers such as dialkyl dixanthogens, tetraalkyl thiuram mono- and polysulfides, mercaptoalkylthiazoles, etc., are also preferably present in the emulsion during the polymerization.

The synthetic rubber latices prepared by the method of this invention may be coagulated by electronic deposition processes employing electric currents or electrolytes in much the same manner as natural latex. For example, an impervious form may be dipped in a suitable coagulant such as an aqueous or alcoholic solution of a multivalent metallic salt and then dipped into the synthetic rubber latex to deposit a strong, elastic film. If the latex has been suitably compounded prior to coagulation, the films may be vulcanized in hot water or steam. It will in general be found that the synthetic rubber latices prepared by the method of this invention resemble natural latex to such an extent that it is not necessary to develop special techniques to be used in connection with the compounding, deposition and vulcanization of the synthetic materials.

Many modifications and variations which will be apparent to those skilled in the art are within the spirit and scope of the invention as defined in the appended claims.

I claim:

1. A synthetic rubber latex prepared by the polymerization in aqueous emulsion of a mixture of monomeric butadiene-1,3, monomeric piperylene in an amount by weight less than the butadiene-1,3, and a monomeric copolymerizable compound selected from the class consisting of styrene, isobutylene, acrylonitrile, methyl methacrylate, methyl acrylate, methyl vinyl ether and methyl vinyl ketone, the said copolymerizable compound being present in an amount between 15 and 50% by weight based on the total weight of the mixture and the combined amount of monomeric butadiene-1,3 and monomeric piperylene being at least 50% by weight based on the total weight of the mixture.

2. A synthetic rubber latex prepared by the polymerization in aqueous emulsion of a mixture consisting solely of monomeric butadiene-1,3, monomeric piperlylene in an amount by weight less than the butadiene-1,3, and monomeric acrylonitrile in an amount between 15 and 50% by weight based on the total weight of the mixture.

3. A synthetic rubber latex prepared by the polymerization in aqueous emulsion of a mixture containing from 40 to 55% by weight of monomeric butadiene-1,3, from 5 to 20% by weight of monomeric piperylene and from 20 to 45% by weight of a monomeric copolymerizable compound selected from the class consisting of styrene, isobutylene, acrylonitrile, methyl methacrylate, methyl acrylate, methyl vinyl ether and methyl vinyl ketone.

4. A synthetic rubber latex prepared by the polymerization in aqueous emulsion of a mixture containing from 40 to 55% by weight of monomeric butadiene-1,3, from 5 to 20% by weight of monomeric piperylene and from 20 to 45% by weight of monomeric acrylontrile.

5. A synthetic rubber latex prepared by the polymerization in aqueous emulsion of a mixture containing from 40 to 55% by weight of monomeric butadiene-1,3, from 5 to 20% by weight of monomeric piperylene and from 20 to 45% by weight of monomeric methyl methacrylate.

6. A synthetic rubber latex prepared by the polymerization in aqueous emulsion of a mixture containing from 40 to 55% by weight of monomeric butadiene-1,3, from 5 to 20% by weight of monomeric piperylene and from 20 to 45% by weight of monomeric styrene.

7. The method which comprises polymerizing in aqueous emulsion a mixture of monomeric butadiene-1,3, monomeric piperlyene in an amount by weight less than the butadiene-1,3, and a monomeric copolymerizable compound selected from the class consisting of styrene, isobutylene, acrylonitrile, methyl methacrylate, methy lacrylate, methyl vinyl ether and methyl vinyl ketone, the said copolymerizable compound being present in an amount between 15 and 50% by weight based on the total weight of the mixture and the combined amount of monomeric butadiene-1,3 and monomeric piperylene being at least 50% by weight based on the total weight of the mixture.

8. The method of claim 7 wherein the monomeric copolymerizable compound is acrylonitrile.

9. The method of claim 7 wherein the monomeric copolymerizable compound is methyl methacrylate.

10. The method of claim 7 wherein the monomeric copolymerizable compound is styrene.

11. A massive synthetic rubber prepared by the coagulation of the latex defined by claim 1.

12. A massive synthetic rubber prepared by the coagulation of the latex defined by claim 2.

13. A massive synthetic rubber prepared by the coagulation of the latex defined by claim 5.

14. A massive synthetic rubber prepared by the coagulation of the latex defined by claim 6.

CHARLES F. FRYLING.